(12) United States Patent
Robb et al.

(10) Patent No.: US 7,364,025 B2
(45) Date of Patent: *Apr. 29, 2008

(54) MAGNETORHEOLOGICAL FAN COUPLING

(75) Inventors: Neil E. Robb, Jackson, MI (US); Rick L. Boyer, Marshall, MI (US); Gary E. Hart, Indianapolis, IN (US)

(73) Assignee: BorgWarner Inc., Auburn Hills, MI (US)

( * ) Notice: Subject to any disclaimer, the term of this patent is extended or adjusted under 35 U.S.C. 154(b) by 167 days.

This patent is subject to a terminal disclaimer.

(21) Appl. No.: 10/908,965

(22) Filed: Jun. 2, 2005

(65) Prior Publication Data

US 2006/0272916 A1 Dec. 7, 2006

(51) Int. Cl.
*F16D 37/02* (2006.01)
*F16D 35/00* (2006.01)

(52) U.S. Cl. ............... 192/21.5; 192/58.4; 192/113.24
(58) Field of Classification Search ............... 192/21.5
See application file for complete search history.

(56) References Cited

U.S. PATENT DOCUMENTS

| | | | |
|---|---|---|---|
| 4,074,662 A | 2/1978 | Estes | |
| 5,896,965 A | 4/1999 | Gopalswamy et al. | |
| 5,967,273 A * | 10/1999 | Hampton | 192/21.5 |
| 6,021,747 A | 2/2000 | Gee et al. | |
| 6,209,700 B1 | 4/2001 | Wogaman et al. | |
| 6,290,043 B1 | 9/2001 | Ginder et al. | |
| 6,318,531 B1 | 11/2001 | Usoro et al. | |
| 6,394,244 B1 | 5/2002 | Dwivedi et al. | |
| 6,543,396 B2 * | 4/2003 | Stretch et al. | 123/41.12 |
| 6,561,141 B2 * | 5/2003 | Stretch et al. | 123/41.12 |
| 6,585,092 B1 | 7/2003 | Smith et al. | |
| 6,634,344 B2 | 10/2003 | Stretch | |
| 7,083,032 B2 * | 8/2006 | Boyer | 192/58.61 |
| 2006/0272917 A1 * | 12/2006 | Robb et al. | 192/21.5 |

\* cited by examiner

*Primary Examiner*—Richard M Lorence

(57) ABSTRACT

A magnetorheological fan coupling (10) having an inverted construction with an input member (18) rotatably mounted to an output member (20). The input member (18) defines a fluid chamber (50) with the output member (20) rotating therein and a magnetic medium (52) between the output member (20) and the input member (18). The coupling (10) further includes an electromagnet subassembly (14) actuated by a controller (82) for adjusting the shear stress of the magnetic medium (52) and regulating the amount of torque transferred from the input member (18) to the output member (20).

20 Claims, 2 Drawing Sheets

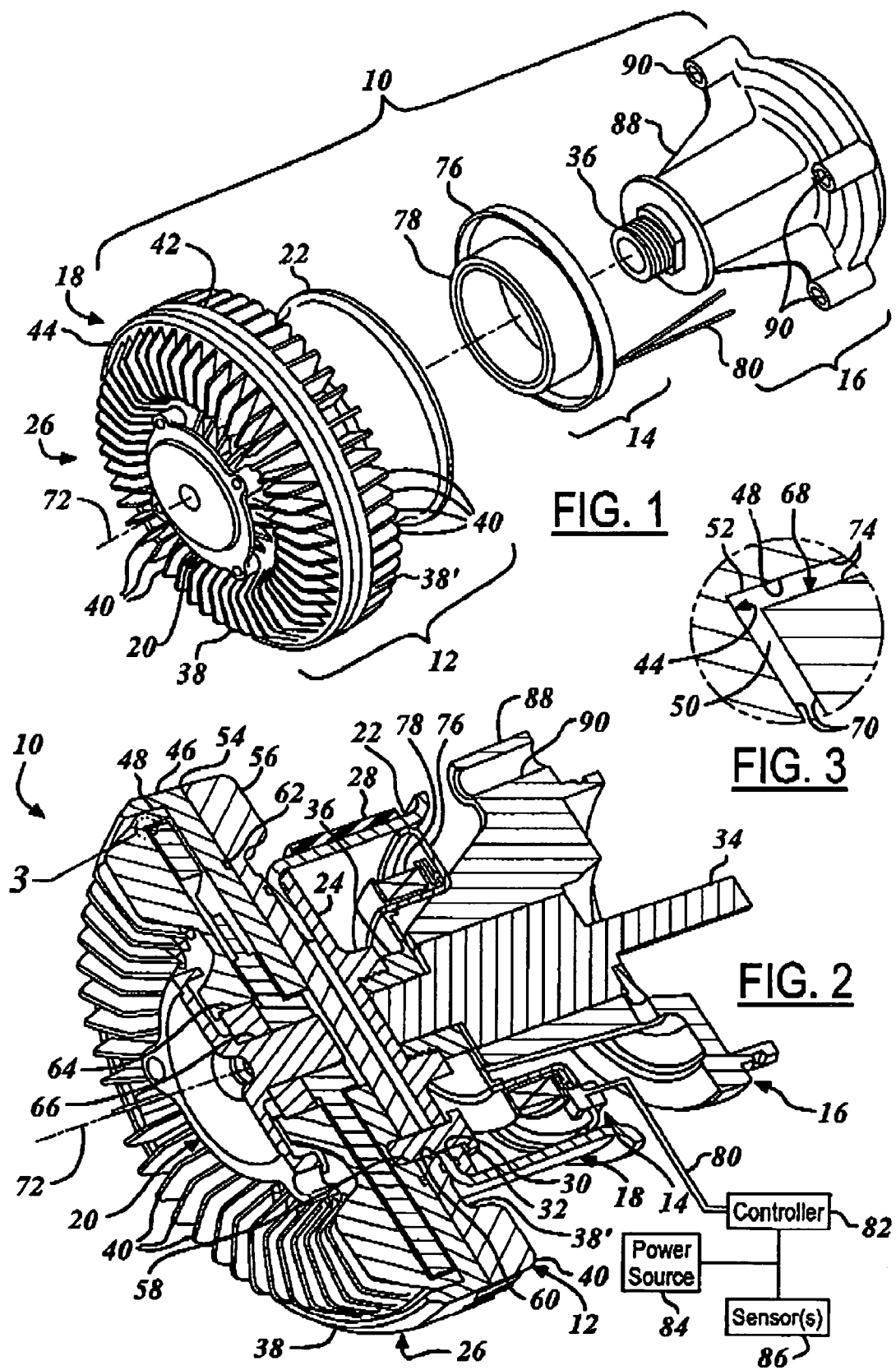

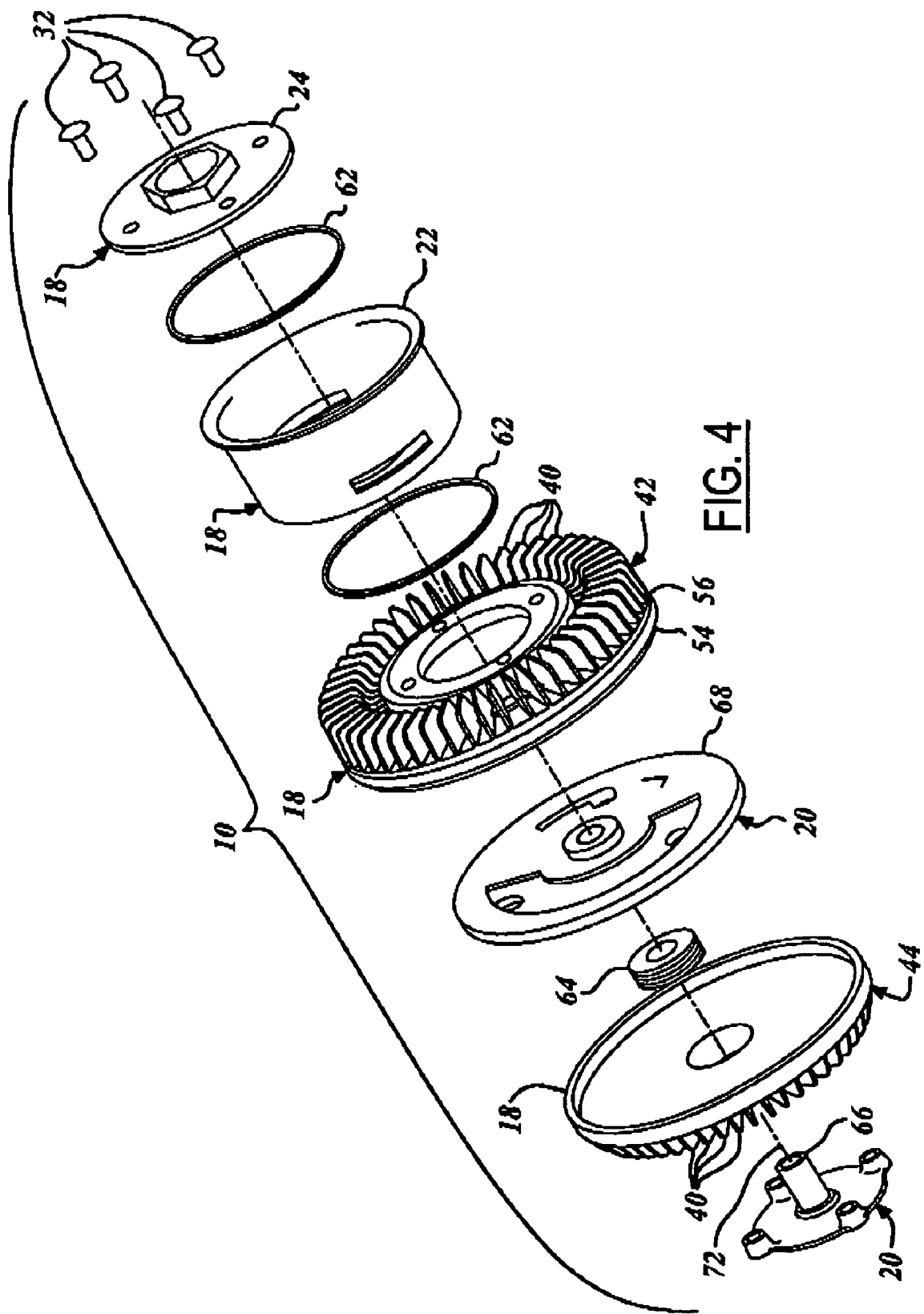

MAGNETORHEOLOGICAL FAN COUPLING

CROSS-REFERENCE TO RELATED APPLICATIONS

This application is related to U.S. Ser. No. 10/929,801, filed on Aug. 30, 2004, entitled "ELECTRONICALLY CONTROLLED FLUID COUPLING DEVICE", the disclosure of which is incorporated herein by reference.

TECHNICAL FIELD

The invention relates generally to engine cooling systems for vehicles, and more specifically to a magnetorheological fan coupling for an engine cooling system.

BACKGROUND ART

Automotive manufacturers have widely produced vehicles having engine cooling systems with viscous fan couplings for conserving engine power and enhancing overall vehicle performance.

Electrically actuated viscous-fluid fan couplings ("electrical fan couplings") have been developed for providing a precisely controlled output, as determined by a vehicle engine computer. Specifically, the typical electrical fan coupling includes a viscous fluid, an operating chamber, a reservoir chamber, and a series of valve mechanisms actuated by the computer for metering the flow of viscous fluid between the operating chamber and the reservoir chamber. In this way, the computer can control the amount of fluid in the operating chamber and selectively engage the coupling for providing a predetermined amount of output.

Existing electrically-actuated viscous fan couplings include an actuator mounted to a rotating portion of the coupling through a ball bearing. Durability of this construction typically is a function of bearing life and tether life. Ideally, a fan coupling without a tether would be preferred if this improves durability and lowers cost while sustaining fan coupling performance attributes.

It would therefore be desirable to provide an improved coupling, particularly one having a robust construction and comprised of generally few parts with enhanced heat rejection.

SUMMARY OF THE INVENTION

One advantage of the invention is that a magnetorheological fan coupling is provided that has a robust construction with components mounted in a stable configuration for minimizing wear and increasing the life of the coupling.

Another advantage of the invention is that a magnetorheological fan coupling is provided that has a relatively simple configuration with generally few components for decreasing the manufacturing cycle time, as well as the costs associated therewith.

Yet another advantage of the invention is that a magnetorheological fan coupling is provided that enhances the rejection of heat therein.

Still another advantage of the invention is that a magnetorheological fan coupling is provided that can be packaged within various sized applications for a variety of systems.

The above and other advantages of the invention are met by the present invention, which is an improvement over known viscous-fluid fan couplings.

The present invention enables a magnetorheological fan coupling having an input member, an output member, and a magnetic medium for transferring torque between the input member and the output member. The magnetic medium is a magnetorheological fluid, a magnetic powder, or other suitable medium with a shear stress that can be adjusted by a magnetic field. The coupling further includes an electromagnet subassembly for selectively inducing a predetermined magnetic field and precisely regulating the shear stress of the magnetic medium. The shear stress of the magnetic medium disposes the coupling in an engaged state, a range of partially engaged states, and a disengaged state. In the engaged state, the magnetic medium has sufficiently high shear stress for transferring a significant amount of force between the input member and the output member. In the disengaged state, the magnetic medium has sufficiently low shear stress for transferring little to no torque between the input member and the output member.

Other features, benefits and advantages of the present invention will become apparent from the following description of the invention, when viewed in accordance with the attached drawings and appended claims.

BRIEF DESCRIPTION OF THE DRAWINGS

FIG. 1 is a partially exploded perspective view of a magnetorheological fan coupling, illustrating the major subassemblies therein, according to a preferred embodiment of the present invention.

FIG. 2 is perspective cross-sectional view of the coupling shown in FIG. 1.

FIG. 3 is enlarged view of an encircled region of the coupling shown in FIG. 2, as taken from within circle 3.

FIG. 4 is a fully exploded perspective view of the fan-drive subassembly and the electromagnet subassembly for the coupling shown in FIG. 2.

BEST MODE(S) FOR CARRYING OUT THE INVENTION

Although the present invention may be used advantageously in coupling devices having various configurations and applications, it is especially advantageous for driving a radiator cooling fan of an internal combustion engine, and will be described in connection therewith.

Referring now to FIG. 1, there is shown a partially exploded view of a magnetorheological fan coupling 10 ("coupling"), according to one advantageous embodiment of the claimed invention. As described above, in this embodiment, the coupling 10 is utilized for selectively transferring power from a vehicle engine (not shown) to a radiator cooling fan (not shown). Additionally, the coupling 10 also is utilized for transferring power from the vehicle engine to a series of impeller blades, which pumps water through the engine block. However, as introduced hereinabove, it will be appreciated that the coupling 10 can be integrated within various other systems for other suitable applications as desired.

Referring to FIG. 1, the coupling 10 generally is comprised of a fan-drive subassembly 12 and an electromagnet subassembly 14 actuating the fan-drive subassembly 12 in an engaged mode, disengaged mode, and a range of partially engaged modes. In this embodiment, as detailed below, the coupling 10 further includes a waterpump subassembly 16 for transferring power from the vehicle engine to the impeller blades of an engine cooling system.

With attention to FIG. 2, the fan-drive subassembly 12 comprises an input member 18 and an output member 20 selectively engaged with the input member 18 via a magnetic medium 52 (shown in FIG. 3). The magnetic medium 52 is a magnetorheological fluid ("MR fluid"), a magnetic powder, or other suitable medium with a shear stress that can be regulated by the induction of various magnetic fields.

The input member 18 generally includes a pulley 22 sandwiched between a hub 24 and a front-end finned structure 26. The pulley 22 is driven by an engine crankshaft (not shown) via a belt 28. The pulley 22 is detachable or otherwise easily removable from the coupling 10 for installing a larger or smaller sized pulley therein. In this way, the coupling 10 has a robust construction that can be adapted for various packaging applications and hence within various vehicles.

Specifically, in this embodiment, the pulley 22 includes one or more openings 30 for passing threaded bolt members 32 therethrough and sandwiching the pulley 22 between the finned structure 26 and the hub 24. The bolt members 32 are also utilized for transferring torque from the pulley 22 to both the finned structure 26 and the hub 24. It is contemplated that the pulley 22 can be mounted to the hub 24 and the finned structure 26 by various other suitable fastening means.

The hub 24 is coupled to the waterpump subassembly 16 for providing power to an engine cooling system (not shown), e.g. impeller blades, and propelling coolant flow within the engine block. In particular, the waterpump subassembly 16 comprises a pump shaft 34 having opposing ends. One end of the shaft 34 has a threaded adapter 36 extending therefrom and the other end has a series of impellers (not shown) for propelling water. Further, the threaded adapter 36 has the hub 24 attached thereon for rotating the hub 24 at the same rotational rate as the pulley 22 and driving the impellers for cooling the engine. It is contemplated that the waterpump subassembly 16 can instead be a stand-alone bracket-pulley subassembly as desired.

The finned structure 26 of the coupling 10 has opposing sides 38 and 38', each with a plurality of fins 40 for producing a flow of air and cooling the coupling 10. Specifically, the finned structure 26 includes a cover 42, which is fixedly attached to the pulley 22 as detailed below, and a body 44 that is coupled to the cover 42. Preferably, the cover 42 has an overlying region 46 that is roll-formed around an outer portion of the overall periphery 48 of the body 44 for rotating the body 44 at the same rate as the cover 42. However, the body 44 can instead be attached to the cover 42 by various other suitable fastening means as desired. Also, in this embodiment, the cover 42 and the body 44 have aluminum die-cast constructions. However, it will be appreciated that the cover 42 and the body 44 can comprise a variety of other suitable constructions and materials.

The cover 42 and the body 44 define one continuous fluid chamber 50 (as shown in FIG. 3) with a selectively viscous magnetic medium 52 therein and the output member 20 rotatable therein. In this embodiment, the cover 42 is comprised of a plate 54 and a finned member 56 attached to the plate 54. This plate 54 assists in defining the fluid chamber 50. In addition, the plate 54 includes the overlying region 46 described above and a hole 58 for attachment of the bolt member 28. Also, the finned member 56 has one or more cutouts 60 for passing the bolt member 28 therethrough and sandwiching the finned member 56 between the plate 54 and the pulley 22. The plate 54 and the finned member 56 have a gasket 62 secured therebetween for sealing the fluid chamber 50. It will be appreciated that the cover 42 can have other suitable constructions as desired. The body 44 has the output member 20 rotatably mounted thereto via a ball bearing attachment 64 or other suitable fixture.

The output member 20 is generally comprised of an output shaft 66, which is rotatably mounted to the ball bearing attachment 64, and a rotor 68 extending orthogonally from the output shaft 66 in the fluid chamber 50. In this regard, the coupling 10 has a front-end fan construction that is sufficiently short for integrating the coupling 10 in relatively small packaging applications. It is understood that the output shaft 66 can be coupled to a radiator cooling fan or various other suitable devices receiving power from the vehicle engine.

Furthermore, with attention to FIG. 3, the body 44, the cover 42, and the rotor 68 each have primary friction surfaces 70 sized sufficiently large for transferring a substantial amount of torque between the input member 18 and the output member 20 via the magnetic medium 52. These primary friction surfaces 70 are positioned substantially orthogonal to a longitudinal axis 72 of the shaft 66. In addition, the rotor 68 and the body 44 have secondary friction surfaces 74, which extend substantially perpendicular from the primary friction surfaces 70 and are sized substantially smaller than the primary friction surfaces 70. In this regard, the coupling 10 has a substantially short overall length.

It will be appreciated that the shear stress of the magnetic medium 52 in the fluid chamber 50, in conjunction with the rotational speed of the body 44 and the cover 42 of the input member 18, determines the torque transferred to the rotor 68 for rotating the output shaft 66. In other words, the torque response is a result of viscous shear within the fluid chamber 50. In this embodiment, the magnetic medium 52 is a magnetorheological fluid. However, the magnetic medium 52 can instead be a magnetic powder for a single-gap construction of the coupling 10 or other suitable magnetic mediums having a shear stress that can be regulated by magnetic fields.

Accordingly, the coupling 10 further includes the electromagnet subassembly 14 for inducing a series of magnetic fields and regulating the shear stress of the magnetic medium 52. In particular, the electromagnet assembly 14 includes a steel housing 76 and a coil 78 attached to the steel housing 76. With attention to FIG. 2, the coil 78 has a wire harness 80 that is electrically coupled to a controller 82 and a power source 84. The controller 82 receives electrical signals from one or more engine sensors 86 regarding engine and vehicle operating conditions. The controller 82 processes these signals to direct the power source 84 to send an electrical current to the coil 78 via the wire harness 80 so as to control the output from the coupling 10 as described in more detail below. Other elements of the electromagnetic circuit contained inside the fan-drive subassembly 12 include the hub 24 comprised of non-ferrous material and the pulley 22 comprised of steel. In this regard, the belt-driven pulley 42 is a component of both the input member and the magnetic path. Further, the threaded adapter 36 on the waterpump subassembly 16 is comprised of steel for completing the electromagnetic circuit.

The electromagnet assembly 14 receives a predetermined amount of electrical power from the power source 84 in terms of pulse width modulation as actuated by the controller 82. In that way, the controller 82 precisely regulates the amount of magnetic flux for controlling the shear stress of the magnetic medium 52. For instance, in this embodiment, the controller 82 receives a set of electrical inputs from various engine sensors 86 that monitor a variety of engine operating conditions. The controller processes these inputs for determining the amount of electrical power to be supplied to the electromagnet subassembly 14. The sensors 86 can be utilized for detecting engine temperature, fuel economy, emissions or other engine operating conditions affecting the performance of the engine.

For example, in one embodiment, the sensors 86 include an engine-mounted water sensor or a pressure sensor mounted to the air conditioner. Furthermore, the controller 82 has a reference table stored therein for determining a desired engine temperature for a given engine speed. When the controller 82 determines from one or more sensors 86 that the engine or engine water temperature is above an undesired high range, the controller 82 sends a signal to the power source 84. Accordingly, the power source 84 provides full or varying power to the coil 78 for producing a maximum strength magnetic field and substantially increasing the shear stress of the magnetic medium 52. In that way, the magnetic medium provides a maximum torque response of the rotor 68 for rotating the output shaft 66 and the radiator cooling fan coupled thereto.

Conversely, if the controller 82 determines that the engine temperature or the engine water temperature is below a minimum threshold, the controller 82 sends a signal to the power source 84 to activate the coil 78 to a desired pulse width and decrease the power supply for the coil 78. In this way, the coil 78 produces a magnetic field for adjusting the shear stress of the magnetic medium 52 to transfer less torque from the input member 18 to the output member 20. Accordingly, the radiator cooling fan coupled to the output member 20 rotates at a slower rate to bring cooling conditions within a desired range and increase the temperature of the engine.

Moreover, the electromagnet subassembly 14 is stationary for minimizing wear on the electrical circuitry therein. Namely, in this embodiment, the waterpump subassembly 16 has a pump housing 88 with a series of through-holes 90 for receiving bolts or other suitable fasteners and fixedly attaching the pump housing 88 directly to the engine block face (not shown) or other suitable vehicle fixture. The pump housing 88 has the electromagnet subassembly 14 with its electrical circuitry mounted therein. In this way, the electrical portion of the coupling 10 is not physically attached to the moving drive components, but rather is mounted to a stationary fixture. As such, there is no tethered wire harness and no actuator bearing. This construction is beneficial for decreasing manufacturing cycle time and costs associated therewith. Further, the coil 78 is easily replaced, which lowers service and warranty costs.

Additionally, the remaining actuator components are integral with the engine side of the fan drive. This leads to lower overhanging mass on the drive components, which leads to higher system resonant frequency and possible improvements in waterpump durability. This also leads to compact packaging, which can improve vehicle costs.

It will be appreciated that the magnetic coupling 10 eliminates a substantial number of pumping mechanisms required with conventional viscous couplings. Thus, the coupling 10 has an inherently stable construction.

In addition, it is understood that the coupling 10 has a substantially robust construction as the electromagnet subassembly 14 is mounted to the waterpump housing 16. Accordingly, wear on the bearings of the coupling 10 are minimized.

While the best modes for carrying out the present invention have been described in detail herein, those familiar with the art to which this invention relates will recognize various alternate designs and embodiments for practicing the invention as defined by the following claims. All of these embodiments and variations that come within the scope and meaning of the present claims are included within the scope of the present invention.

What is claimed is:

1. A magnetic fan coupling comprising:
    a drivable input member rotatably mounted to a stationary vehicle fixture and defining a fluid chamber;
    an output member having a rotor within said fluid chamber and a shaft extending from said rotor;
    a magnetic medium disposed within said fluid chamber between said input member and said output member;
    an electromagnet subassembly for adjusting a shear stress of said magnetic medium and regulating a torque transferred between said input member and said output member; and
    a controller for selectively actuating said electromagnet subassembly;
    wherein said input member has a pair of opposing sides with a plurality of external fins for producing a flow of air that cools said magnetic medium when said input member is driven to rotate.

2. The magnetic fan coupling of claim 1, wherein said magnetic medium comprises at least one of a magnetorheological fluid and a magnetic powder.

3. The magnetic fan coupling of claim 1, wherein said input member comprises:
    a cover; and
    a body coupled to said cover for defining said fluid chamber;
    wherein said cover and said body have said plurality of fins extending therefrom for improving heat rejection.

4. The magnetic fan coupling of claim 1, wherein said input member includes a removable pulley that is drivable by an engine-mounted belt.

5. The magnetic fan coupling of claim 1, wherein said fluid chamber is offset from said electromagnet subassembly along a longitudinal axis of said shaft.

6. The magnetic fan coupling of claim 1, wherein said input member and said output member each have a pair of opposing primary friction surfaces for transferring torque from said input member, through said magnetic medium, and to said output member;
    wherein said primary friction surfaces are substantially orthogonal to a longitudinal axis of said shaft of said output member.

7. The magnetic fan coupling of claim 6, wherein said input member and said output member each have a secondary friction surface that is perpendicular to and substantially smaller than said primary friction surfaces.

8. The magnetic fan coupling of claim 1, said magnetic fan coupling further comprising:
    at least one sensor electrically coupled to said controller and operable to send an electrical signal to said controller as a function of a desired engine operating condition.

9. A magnetic fan coupling comprising:
    a drivable input member rotatably mounted to a stationary vehicle fixture and defining a fluid chamber;
    an output member rotatably mounted to said input member within said fluid chamber and having both a rotor within said fluid chamber and a shaft extending from said rotor;
    a magnetic medium disposed within said fluid chamber between said input member and said output member;
    an electromagnet subassembly for magnetizing said magnetic medium to adjust a shear stress of said magnetic medium and regulate a torque transferred between said input member and said output member;

a power source electrically coupled to said electromagnet subassembly; and a controller coupled to said power source and said electromagnet subassembly for selectively actuating said electromagnet subassembly;

wherein said input member has a pair of opposing sides with a plurality of external fins extending therefrom for producing a flow of air that rejects heat and thereby cools said magnetic medium when said input member is driven to rotate; and wherein said input member is adapted for having a series of different-sized pulleys integrated therein so that said magnetic fan coupling can be utilized in a plurality of different-sized vehicles.

10. The magnetic fan coupling of claim 9, wherein said magnetic medium comprises at least one of a magnetorheological fluid and a magnetic powder.

11. The magnetic fan coupling of claim 9, wherein said input member comprises:

a cover; and a body coupled to said cover for defining said fluid chamber;

wherein said cover and said body have said plurality of fins extending therefrom for improving heat rejection.

12. The magnetic fan coupling of claim 9, wherein said input member includes a removable pulley that is drivable by an engine-mounted belt.

13. The magnetic fan coupling of claim 9, wherein said fluid chamber is offset from said electromagnet subassembly along a longitudinal axis of said shaft.

14. The magnetic fan coupling of claim 9, wherein said input member and said output member each have a pair of opposing primary friction surfaces for transferring torque from said input member, through said magnetic medium; and to said output member;

wherein said primary friction surfaces are substantially orthogonal to a longitudinal axis of said shaft of said output member.

15. The magnetic fan coupling of claim 14, wherein said input member and said output member each have a secondary friction surface that is perpendicular to and substantially smaller than said primary friction surfaces.

16. The magnetic fan coupling of claim 9, said magnetic fan coupling further comprising:

at least one sensor for sending an electrical signal to said controller to determine a power supply amount for said electromagnet subassembly and also actuate said power source so as to provide said power supply amount to said electromagnet subassembly.

17. A magnetic fan coupling comprising:

a drivable input member rotatably mounted to a stationary waterpump housing and defining a fluid chamber;

an output member having a rotor within said fluid chamber and an output shaft extending from said rotor;

a magnetic medium disposed within said fluid chamber between said input member and said output member;

an electromagnet subassembly coupled to said stationary waterpump housing and operable to adjust a shear stress of said magnetic medium and regulate a torque transferred between said input member and said output member;

a power source electrically coupled to said electromagnet subassembly; and a controller coupled to said power source and said electromagnet subassembly for selectively actuating said electromagnet subassembly;

wherein said input member has a pair of opposing sides with a plurality of external fins extending therefrom for producing a flow of air that rejects heat and thereby cools said magnetic medium when said input member is driven to rotate;

wherein said input member includes a removable belt-driven pulley and is adapted for having a series of different-sized pulleys integrated therein so that said magnetic fan coupling can be utilized in a plurality of different-sized vehicles; and wherein said input member further has a waterpump shaft coupled to said removable belt-driven pulley and bearing-mounted within said stationary waterpump housing.

18. The magnetic fan coupling of claim 17, wherein said magnetic medium comprises at least one of a magnetorheological fluid and a magnetic powder.

19. The magnetic fan coupling of claim 17, wherein said fluid chamber of said input member is offset from said electromagnet subassembly along a longitudinal axis of said output shaft.

20. The magnetic fan coupling of claim 17, wherein said input member and said output member each have a pair of opposing primary friction surfaces for transferring torque from said input member, through said magnetic medium, and to said output member; and wherein said primary friction surfaces are substantially orthogonal to a longitudinal axis of said output shaft of said output member.

* * * * *